March 16, 1943. L. F. BORCHARDT 2,314,119
CHEMICAL TREATMENT APPARATUS
Filed Feb. 11, 1939 2 Sheets-Sheet 1

INVENTOR
LESTER F. BORCHARDT
BY Paul, Paul, Moore & Giese
ATTORNEYS

Patented Mar. 16, 1943

2,314,119

UNITED STATES PATENT OFFICE 2,314,119

CHEMICAL TREATMENT APPARATUS

Lester F. Borchardt, Minneapolis, Minn., assignor to General Mills, Inc., Minneapolis, Minn., a corporation of Delaware Application February 11, 1939, Serial No. 255,931

2 Claims. (Cl. 204—311)

This invention relates to an apparatus for vaporizing and treating materials under high vacuum and has particular reference to an apparatus for vaporizing and treating a continuous stream of ergosterol or other activatible substance under high vacuum in order to impart thereto the physiological property of curing rickets.

It is a general object of the present invention to provide a simple and efficient apparatus in which a large supply of solid ergosterol may be gradually automatically vaporized and treated under vacuum conditions and resultant treated product be collected.

Continued heating of ergosterol over long periods tends to promote decomposition and it is accordingly another object of the invention to provide an improved form of apparatus in which a large supply of ergosterol to be treated may be stored and gradually moved through an apparatus for vaporization and treatement.

It is a further object of the invention to provide an improved apparatus having a unitary vaporization and treatment zone and a unitary heating apparatus for such zone.

It is also an object of the invention to provide a treating apparatus which is connected in vapor-tight relation to a solid storage feeding apparatus, but in which the heating and storage zones are flexibly connected so that vibrations or movements of one will not damage the other.

It is also an object of the invention to provide an activation tube which may readily be removed from the apparatus for cleaning and servicing.

One form of the apparatus is illustrated in the drawings in which

Figure 3 is a sectional view along the lines 3—3 of Figure 2; and

Figure 4 is a sectional view of the flexible connection of the assembled apparatus.

Throughout the drawings corresponding numerals designate corresponding parts in all views.

Figure 1:
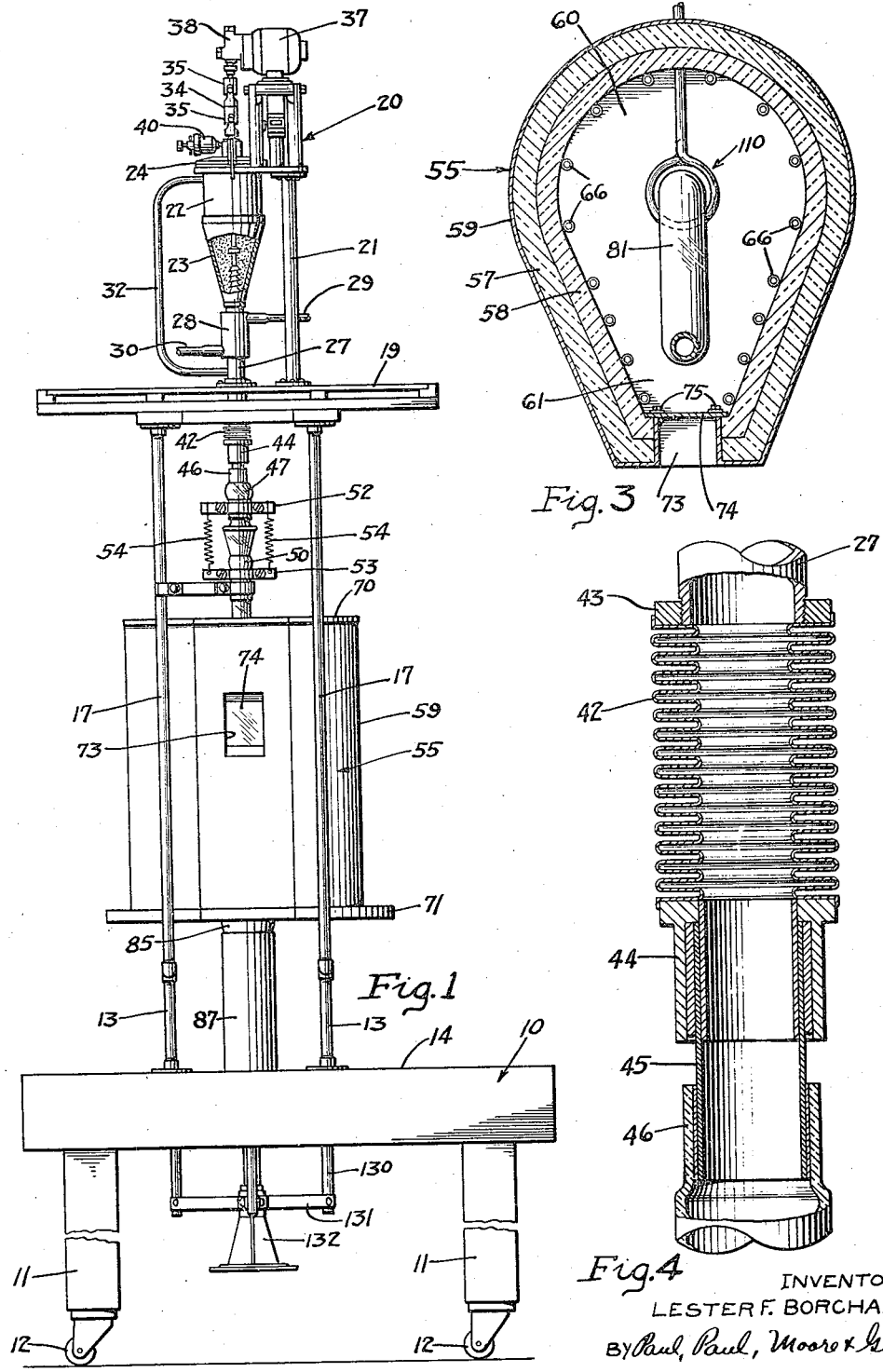
Figure 1 is a front elevational view of the assembled apparatus.

The automatic vaporizing, treating and collecting apparatus of the present invention is shown in assembled condition in Figure 1 and consists of a truck mounted apparatus. The truck generally designated 10 has legs 11 which are provided with castors 12 so as to render the device portable. On the truck there is mounted a framework of pipes consisting of short pipe columns 13 which extend from the truck table 14 to the base of the vaporizing and treating zone generally designated 55. Side arms 16, best shown in Figure 2, extend outwardly and then upwardly as at 17 and serve to support an upper table 19 upon which the solid material storage and feeding mechanism generally designated 20 is mounted.

The feed mechanism of the present inventon may be of the character shown in the co-pending application Serial No. 725,408 of Ferrari and Borchardt, filed May 12, 1934, now patent No. 2,262,995, Nov. 18, 1941, but is preferably a feeding mechanism such as that shown in co-pending Ferrari application Serial No. 247,203, filed Dec. 22, 1938.

The feeding mechanism is mounted upon a pipe frame 21 and consists of a reservoir 22 having a downwardly converging cone portion 23 and a removable cover 24. At the bottom end of the cone portion 23 there is a downspout 27 which is waterjacketed as shown at 28. The cool water inlet to the waterjacket is shown at 30 and the water outlet at 29. The storage chamber 22—23, the downwardly extending tube 27, and the cover 24 are all vacuum-tight so that a high vacuum may be maintained therein. The downwardly extending tube 27 is connected to the upper portion of the storage chamber 22 by a pipe 32 which serves to equalize the pressure in the space above the solid being stored and in the downwardly extending pipe 27.

Within the storage chamber 22 there is a feed screw the shaft of which extends through cover 24 and terminates in a drive shaft 34 which is provided with a universal drive 35. The drive shaft 34 is driven at a low rate of speed by motor 37 which is provided with a gear box 38 by which the high speed of the motor is reduced to a very low speed for rotation of the drive shaft 34.

The drive shaft is provided with a vacuum-tight gland consisting of a rotatable conical plug which fits into a conical recess in the cover 24. The gland is provided with a grease cup 40 through which vacuum seal grease may be injected into the conical plug joint to render the seal vacuum tight.

Figure 2:
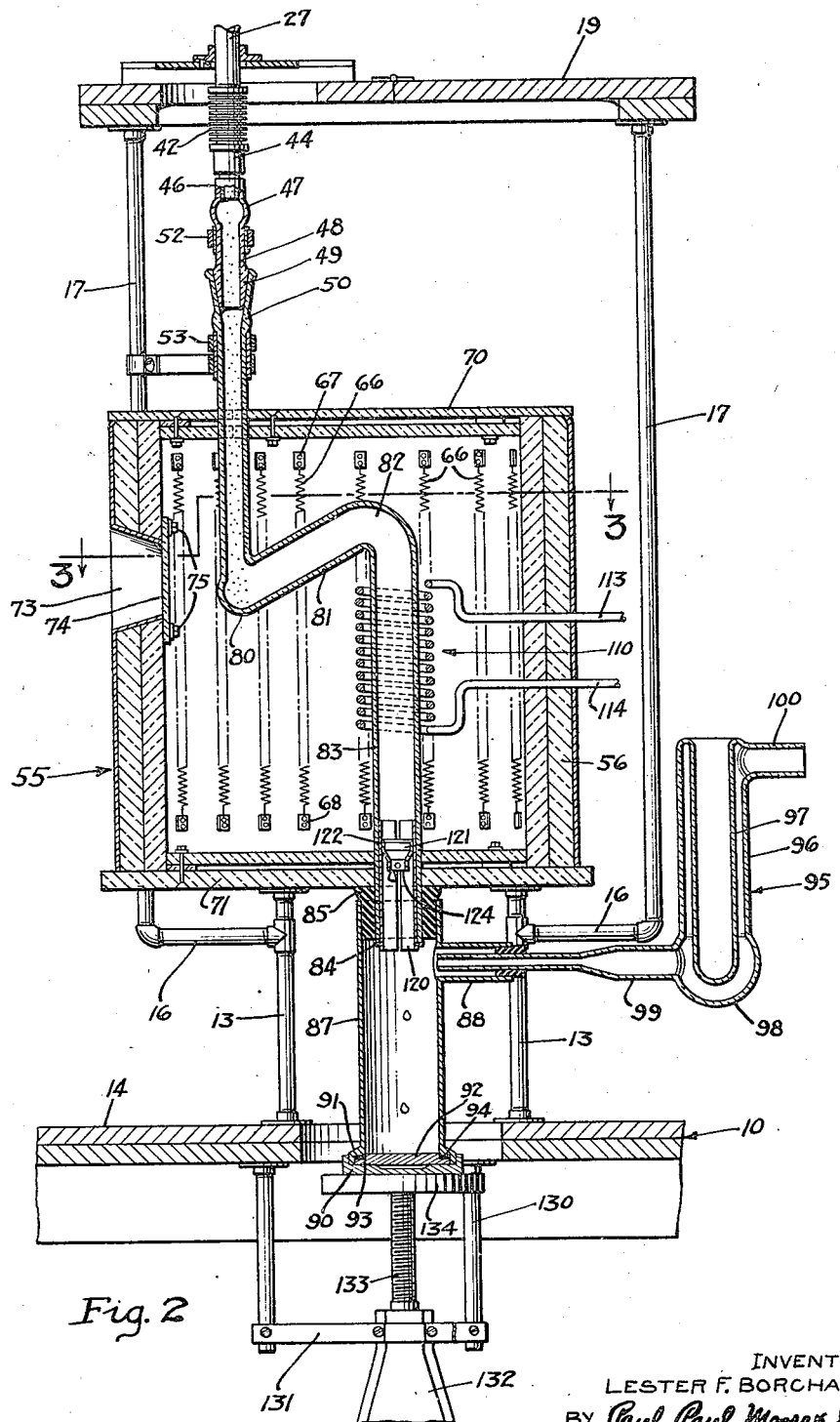
Figure 2 is a fragmentary side elevational view partly in section of the heating and treating zone, and collection device of the assembly.

At the lower end of the downwardly extending tube 27 there is provided a flexible connection herein illustrated as a Sylphon bellows tube 42 of thin metal (shown in Figure 4), which is provided at its upper end with a coupling 43 by which it is secured onto the lower end of the tube 27 and at the lower end a downwardly extending sleeve 44 of metal which is in turn sealed to tube 45. The tube 45 is joined to a glass tube 46 which has an enlarged bell-shaped portion 47, as shown in Figures 1 and 2 which enables the operator of the device to note the feed of solid material through this portion of the apparatus. Beneath the large bell 47 there is a downwardly extending tubular portion 48 which is formed into a conical portion 49. This is ground to fit the upwardly extending inlet tube 50 of the vaporizing and treating apparatus.

Cross frames 52 and 53 are provided on tubes 48 and 50, respectively, and these are joined together by springs 54 which serve to maintain the joint in vacuum-tight relation. The joint is preferably coated with vacuum seal grease to increase its tightness and to facilitate separation when necessary.

The vaporizing and treating zone 55 consists of a furnace having side walls which are composed of a plurality of layers of insulated material 57 and 58 and an outer protective sheath 59. The cross-sectional shape of the furnace is shown in Figure 3 and as will be noted has a circular portion 60 and a straight side portion 61. The heating elements of the furnace preferably consist of electrical resistance coils 66 which are supported by terminal blocks 67 and 68 as shown in Figure 2.

The coils 66 are comparatively widely spaced in the circular zone 60 and are spaced closer together in the zone 61 so that the zone 61 is heated to a somewhat higher temperature than the zone 60.

The furnace is provided with a double wall upper cover 70 and a double wall lower cover 71 of insulating board such as molded asbestos or magnesia. The zone 61 of the furnace is provided with a window 73 which has a glass or mica window pane 74, the latter being held in place by small screws 75.

The heating and vapor treating tube consists of a downwardly extending tube 50 which is preferably made of the same diameter tube as that used for tubes 27, 48, etc. Tube 50 terminates in a bulbous portion 80 from which there is an upwardly and outwardly extending vapor delivery tube 81 of somewhat larger diameter, which bends at 82 and thereafter extends downwardly throughout the portion 83 and terminates outside of the furnace as shown at 84. The lower end 84 of the tube is provided with a large-hole rubber stopper 85 to which there is connected a metal receiving vessel 87. The latter is provided with a bottom cap 90 which is screw-threaded upon a metal ferrule 91. The ferrule 91 is in turn welded to the metal tube 87. An inner gasket pressure plate 92 is provided and has a marginal recess 93 to receive gasket 94 of rubber or the like, which serves, when the cap 90 is screwed down tightly, to render the bottom of tube 87 vacuum-tight.

Near the upper end of the collection tube 87 there is a side arm 88 which serves as the vacuum exhaust for the system. The vacuum exhaust line is taken through a vapor trap 95 consisting of a double-walled vessel having an outer wall 96 and an inner wall 97 joined together at the top. The outer vessel 96 is bulbous at its lower end 98 so as to provide large condensate capacity. A side arm 99 is provided as shown in Figure 2, which serves as the connection to collection vessel 87, and another side arm 100 is provided at the upper portion of the outer vessel 96 and serves as the connection to the vacuum pumps.

Within the vaporization and treating chamber there is provided suitable means for activating the material flowing through the tube. As here shown there is provided means generally designated 110, for imparting oscillatory electrical energy to the portion 83 of the vaporization and treating tube. As illustrated this means consists of a coil of copper or other metal of high electrical conductivity. The coil surrounds the portion 83 of the tube, and is provided with terminals 113 and 114 which extend through the side wall 56 of the furnace. The coil is arranged to be energized with high frequency current from a source not shown.

Any other desired activating agency such as other electrical discharges, ultra violet energy, cathode rays, etc. may be used in place of an electrodeless discharge for energizing material flowing through the tube.

The positioning of the heating coils 66 in the furnace provides the heat necessary for vaporization in the bulbous portion 80 of the tube and the heat for maintaining the material in the vaporized state in portions 81 and 83 of the tube.

If desired the heat for furnace 55 may be produced in a separate unit and conducted to the vaporizing and treating furnace 55.

Within the lower end 84 of the treating tube there is provided an elongated split sleeve 120 of metal which bears against the inner surface of the tube 83. Within sleeve 120 there is a drip cone 121 which has an upper chamfered edge 122 in contact with the inner surface of the sleeve 120 and a drip surface 124. The drip cone 121 is positioned at or slightly below the zone in which condensation of the activated treated material takes place. If positioned too high, the uncondensed vapors will pass through the cone 121 and will condense upon and clog the lower end of tube 84. If too low, the vapors will condense, solidify and will clog the drip cone 121 itself. By the use of the elongated heat conducting metal sleeve 120, a zone of comparatively uniform temperature is provided which renders the positioning of the drip cone 121 less critical than when the sleeve 120 is not used.

After the ergosterol or other material has been activated in the tube 83 and cooled somewhat as a result of passage beyond the heating elements 66, it becomes a viscous liquid which collects upon and accordingly drops from the cone surface 124. The drip is concentrated towards the center of the tube and therefore does not accumulate or clog the smaller end of the tube 84, but falls to the bottom of the collection vessel 87 where it accumulates.

Beneath the table top 14 there is a downwardly extended pipe frame 130 having a cross-bar 131, to which a jack 132 is coupled. The jack screw 133 is provided with a table 134 which carries the entire collection vessel 87. By rotating the screw 133 the collection vessel 87 may be raised and moved into vacuum-tight engagement with the rubber stopper 85.

The vaporizing and treating tube 80—83 is hand-blown glass and accordingly various tubes of the same design differ slightly in dimensions. When a new tube is substituted for an old tube the coupling 52, 53, 54 is loosened and the joint 48, 49 opens. A new tube is then placed in the furnace and ground joint 48, 49 reassembled and the spring couple 52, 53, 54 again arranged as shown in Figure 1. Any slight variations in dimension or position of the upper tube 50 is compensated for by the bellows 42 which is flexible and free to move both sideways and inward.

During operation of the device material is placed in the reservoir 22, 23 and the cover 24 moved into place. A vacuum-tight joint between the cover 24 and reservoir 22 is facilitated by liberal use of vacuum joint grease.

The collection tube 87 is then placed as previously described and vacuum pumps, not illustrated, are coupled to tube 100. As evacuation takes place in the system the portions 48, 49 are pulled into tight contact if not already drawn tight by springs 54. The vacuum within the tube 27 is communicated to the upper portion of the reservoir 22 above the surface of the solid granulated material therein.

The drive mechanism consisting of motor 37, gear box 38 and flexible shaft 34 is then coupled to the screw feed arrangement and the motor started in operation. The material is then fed directly downwardly through the tube 27, but since the tube 27 is water-cooled by water-jacket 28, the material in the reservoir remains cool and non-affected until it falls through the vessel tubular portion of the apparatus consisting of flexible couple 42, joint 48, 49 and inlet tube 50 to the vaporization zone 80 of the vaporization and reaction tube. As the material falls into bulbous vaporization zone 80, it is vaporized and the vapors pass upwardly through portion 81 of the tube and then downwardly through the treating zone 83.

As the vaporized material passes through the tube 83 it is subjected to the activating agency employed, as for example, an electrodeless discharge, and after slight cooling and condensation the material drops freely by gravity from surface 124 into the collection vessel 87 where it accumulates and cools. Throughout the operation of the apparatus which incidentally continues until the reservoir 22 is emptied, high frequency oscillatory energy is supplied to the coil 110, a flow of water or cooling medium is maintained through jacket 28, and the vacuum pumps are maintained in operation. The inner tube 97 of the trap, generally designated 95, is filled with solid carbon dioxide and serves to collect any condensable vapors of material which may pass through side arm 99. These vapors are condensed and accumulate at the bulb 98 of the trap and therefore do not pass to the vacuum pumps. The bulb 98 is made of sufficient size so as to accumulate all of the material passed into the trap during the complete run. During the operation of the tube carbonization takes place in the vaporization and activation zones of the tube, and this residue must be removed before a subsequent run. In the present apparatus carbonization is predominately in the treating zone 83 from which it may easily be removed. The entire tube can be separated from the remainder of the apparatus and the residue removed by submerging in an acid bath, or by heating the tube with a Bunsen flame while passing a current of air therethrough for oxidation of the residue. The fact that the entire tube is entirely separable from the heating and treating apparatus ancillary thereto, greatly facilitates servicing the apparatus illustrated herein.

Many obvious variations will occur to those skilled in the art. As above indicated means other than those specifically illustrated may be utilized to impart activation to activatible material flowing through the tube, the size and shape of the vaporization portion 80 may be varied, the type and position of the heating elements 66 may be varied, or heated air or vapors may be produced outside of the furnace 55 and may be conducted into the furnace by suitable duct-work.

Moreover, while the invention has been described as applied to apparatus used for producing vitamin D, it will be understood that the invention may be applied to other forms of apparatus for treating other materials for other purposes.

These and other variations which will occur to those skilled in the art are deemed to be within the scope of the invention herein illustrated and claimed as follows:

I claim as my invention:

1. In an apparatus for treating ergosterol or other activatible material to impart the antirachitic property thereto of the type comprising a substantially Z-shaped tube having two vertical legs and having an upwardly extending transverse portion connecting the two legs, the portion of the tube adjacent the junction of the first leg with the upwardly extending transverse portion constituting a vaporizing zone, and the second leg of the tube having a treating zone, means for maintaining a vacuum in the tube, means for feeding down the first leg the material to be vaporized and means for treating the vapor in the said treating zone of the said second leg to alter its chemical characteristics; the improvement which comprises a unitary heating chamber surrounding the said first vertical leg and the said second vertical leg, heating elements positioned in spaced relation about the inner surface of the wall of the said chamber and about the said first and second vertical legs, and the said heating elements grouped more closely about the said first vertical leg than about the said second vertical leg and the said wall of the said heating chamber being spaced further from the said second vertical leg than from the said first vertical leg whereby the vaporization of the said material fed down the said first leg may be initiated and the said vaporized material may be retained in vaporized condition while in the said treating zone of the said second leg at a temperature below that of the vapor initiating temperature in the said first leg so as to permit the ready condensation of the said vaporized material upon passage from the said treating zone of the said second leg for the collection thereof.

2. In an apparatus for vaporizing and chemically treating material under vacuum of the type comprising a substantially Z-shaped tube having two vertical legs and having an upwardly extending transverse portion connecting the two legs, the portion of the tube adjacent the junction of the first leg with the upwardly extending transverse portion constituting a vaporizing zone, and the second leg of the tube having a treating zone, means for maintaining a vacuum in the tube, means for feeding down the first leg the material to be vaporized and means for treating the vapor in the said treating zone of the said second leg to alter its chemical characteristics; the improvement which comprises a unitary heating chamber surrounding the said vaporizing and treating zones, a plurality of heating elements positioned within the said heating chamber and about the said vaporizing and the said treating zones, the said heating elements grouped more closely about the said vaporizing zone than about the said treating zone whereby the vaporization of the said material may be initiated and the said vaporized material may be retained in vaporized condition while subject to the aforesaid treatment to alter its chemical characteristics.

LESTER F. BORCHARDT.